United States Patent [19]
Liu

[11] Patent Number: 6,097,319
[45] Date of Patent: Aug. 1, 2000

[54] QUADRATURE ENCODING DEVICE WITH SLOPE-TRIGGERED DIGITIZING CIRCUIT

[75] Inventor: Shu-Ming Liu, Taipie, Taiwan

[73] Assignee: Primax Electronics Ltd., Taipei Hsien, Taiwan

[21] Appl. No.: 09/123,006

[22] Filed: Jul. 27, 1998

[30] Foreign Application Priority Data

May 18, 1998 [TW] Taiwan ................................. 87107653

[51] Int. Cl.⁷ ..................................................... H03M 1/22
[52] U.S. Cl. ............................................... 341/8; 341/144
[58] Field of Search .................... 341/8, 13, 14, 341/144, 145, 155, 111

[56] References Cited

U.S. PATENT DOCUMENTS

| | | | |
|---|---|---|---|
| 3,821,896 | 7/1974 | Grob | 73/194 E |
| 3,845,362 | 10/1974 | Roe | 317/134 |
| 4,653,905 | 3/1987 | Farrar et al. | 356/4 |

FOREIGN PATENT DOCUMENTS 2208316  3/1989  United Kingdom ........... G01B 18/00

*Primary Examiner*—Michael Tokar
*Assistant Examiner*—Peguy JeanPierre
*Attorney, Agent, or Firm*—Christie, Parker & Hale, LLP

[57] ABSTRACT

A quadrature encoding device with slope-triggered digitizing circuit is provided for use in a mechanical mouse. The quadrature encoding device is capable of producing two square-wave signals indicative of the current mouse movement for position control of the mouse cursor on the computer screen. The slope-triggered digitizing circuit includes a delay circuit and an analog comparator, which is capable of generating a first voltage output when the slope of the opto-electrical signal from the photo detector is positive, and a second voltage output when the slope is negative. It is characteristic feature of the quadrature encoding device that the output characteristic of the slope-triggered digitizing circuit would not be affected by any deviations in the output characteristic of the associated photo detectors, and also would not be affected by the ambient light. Moreover, the quadrature encoding device can operate without having to make adjustments on threshold voltage, which makes the quadrature encoding device more convenient to use, simpler in circuit complexity, and lower in manufacturing cost as compared to the prior art.

12 Claims, 7 Drawing Sheets

QUADRATURE ENCODING DEVICE WITH SLOPE-TRIGGERED DIGITIZING CIRCUIT

CROSS-REFERENCE TO RELATED APPLICATION

This application claims the priority benefit of Taiwan application serial no. 87107653, filed May 18, 1998, the full disclosure of which is incorporated herein by reference.

BACKGROUND OF THE INVENTION

1. Field of the Invention

This invention relates to mouse for computers, and more particularly, to a quadrature encoding device with an improved bistable trigger circuit (referred to as a slope-triggered digitizing circuit in this specification), which can be used in a mechanical mouse for producing two square-wave signals that can be combined to indicate the current mouse movement for position control of the mouse cursor on the computer screen.

2. Description of Related Art

Modem computers typically utilize a graphic-based operating environment, called graphical user interface (GUI), for the user to operate the computer conveniently and easily with a point device, such as a mouse or the like. The user can select and activate options simply by pointing and clicking with the mouse.

FIG. 1 is a schematic diagram used to depict the operation of a typical mechanical mouse. As shown, this type of mouse includes a ball 140, a shaft 125, a turning disk 120, and a light source 110 such as a light-emitting diode (LED), and a double-detector photo detection module 130 (note that the mouse actually includes a pair of shafts and a pair of turning disks for the translation of the ball motion into analog electrical signals, but since they are identical in structure and function, only one is illustrated). The double-detector photo detection module 130 includes a pair of photo transistors 131, 132 which are separated by a predetermined distance (see FIG. 2B). Further, as shown in FIG. 2A, the turning disk 120 is a circular disk having a plurality of slots 121 arranged at equal intervals on the rim thereof. When the user moves the mouse over a desk pad in a particular direction, it will cause the ball 140 to rotate in the corresponding direction. The rotation of the ball 140 is then transmitted via the shaft 125 to the turning disk 120, causing the turning disk 120 to rotate. As a result, the light from the light source 110 will intermittently pass through the slots 121 in the turning disk 120 onto the double-detector photo detection module 130. As shown in FIG. 2B, the double-detector photo detection module 130 includes a pair of photo detectors 131, 132, such as a pair of photo transistors. When the slots 121 in the turning disk 120 pass one after one over the photo transistors 131, 132, the light striking on the photo transistors 131, 132 will vary in intensity substantially in a sinusoidal manner. In response, the first photo transistor 131 will generate a first opto-electrical signal A, while the second photo transistor 132 will generate a second opto-electrical signal B, each with a sinusoidal waveform as illustrated in FIG. 2C.

Referring to FIG. 2B together with FIG. 2C, when the first photo transistor 131 is entirely exposed through any one of the slots 121 in the turning disk 120, the output opto-electrical signal A from the first photo transistor 131 will be at the maximum amplitude, as indicated by the point P1 in FIG. 2C. As the current slot 121 moves onwards, the first photo transistor 131 will gradually become partly exposed through the current slot 121 to light source 110, thus causing the output opto-electrical signal A to be gradually declining in amplitude. Until the first photo transistor 131 is entirely unexposed through any of the slots 121 in the turning disk 120 to the light source 110, the output opto-electrical signal A from the first photo transistor 131 will be at the minimum amplitude, as indicated by the point P2 in FIG. 2C. This results in a sinusoidal waveform for the output opto-electrical signal A from the first photo transistor 131. Similarly, the output opto-electrical signal B from the second photo transistor 132 is also a sinusoidal waveform. By specification, the first and second photo transistors 131, 132 are separated by a predetermined distance and the slots 121 in the turning disk 120 are arranged at a predetermined fixed interval that allow the output opto-electrical signals A, B to be out of phase by a predetermined degree, for example 90° (hence, the encoding means is referred to as a quadrature encoding device).

FIG. 3 is a schematic diagram showing the detailed circuit structure of the conventional quadrature encoding device utilized in the mouse of FIG. 1 to translate the disk motion into digital signals that can be further processed and then used for position control of the mouse cursor on the computer screen. As shown, the first opto-electrical signal A from the first photo transistor 131 is taken from the potential drop across a first resistor 331 connected between the first photo transistor 131 and the ground; and in a similar manner, the second opto-electrical signal B from the second photo transistor 132 is taken from the potential drop across a second resistor 332 connected between the second photo transistor 132 and the ground. The amplitude of the first opto-electrical signal A is proportional to the intensity of the light incident on the first photo transistor 131; and likewise, the amplitude of the second opto-electrical signal B is proportional to the intensity of the light incident on the second photo transistor 132.

The first opto-electrical signal A from the first photo transistor 131 is subsequently converted by a first Schmitt circuit 311 (which a well-known bistable trigger circuit) into a first square-wave signal A', in such a manner that when the amplitude of the opto-electrical signal A is above a predefined threshold level $V_r$, as shown in FIG. 4, the output signal A' is switched to a high-voltage logic state, representing a first logic value, for example 1; and when below the threshold level $V_r$, the output signal A' is switched to a low-voltage logic state, representing a second logic value, for example 0.

In a similar manner, the second opto-electrical signal B from the second photo transistor 132 is subsequently converted by a second Schmitt circuit 312 into a second square-wave signal B', in such a manner that when the amplitude of the opto-electrical signal B is above a predefined threshold level $V_r$, as shown in FIG. 4, the output signal B' is switched to a high-voltage logic state; and when below the threshold level $V_r$, the output signal B' is switched to a low-voltage logic state.

By present mouse standard, the width of each of the slots 121 in the turning disk 120 and the distance between each neighboring pair of the slots 121 are both set to be exactly ¾ of the separating distance between the first and second photo transistors 131, 132. This scheme allows the two opto-electrical signals A, B to be out of phase by 90°. When the turning disk 120 is rotating at a fixed speed in a certain direction, the two opto-electrical signals A, B will have the same period, but have a phase difference of 90°, as illustrated in FIG. 4. As a result, each time when the first opto-electrical signal A reaches the maximum amplitude (the point P1), the second opto-electrical signal B will reaches the maximum amplitude after a duration of ¼ of the period thereof. Assume the threshold level $V_r$ is set at the mid-point between the maximum and minimum amplitude points the opto-electrical signal, then the second square-wave signal B' will lag the first square-wave signal A' by a duration of half of the width of each pulse thereof, as illustrated in FIG. 4. These two square-wave signals A', B' are then transferred to a micro-controller unit (MCU) 320, which accordingly determines the current direction and displacement of the mouse being moved by the user for position control of the mouse cursor on the computer screen.

FIGS. 5A–5B are schematic diagrams used to depict the logic values of (A', B') in relation to the rotational direction of the turning disk 120; wherein FIG. 5A shows the case of the turning disk 120 being rotating in the clockwise direction, while FIG. 5B shows the case of the turning disk 120 being rotating in the counterclockwise direction.

Assume each high-voltage state in the square-wave signals (A', B') represents a logic value of 1, and each low-voltage state represents a logic value of 0. Then, as shown in FIG. 5A, when (A', B') varies cyclically in the sequence (00)→(10)→(11)→(01)→(00), it indicates that the turning disk 120 is currently being rotated in the clockwise direction. Whereas, as shown in FIG. 5B, when (A', B') varies cyclically in the sequence (00)→(01)→(11)→(10)→(00), it indicates that the turning disk 120 is currently being rotated in the counterclockwise direction. Moreover, the speed of the mouse movement can be determined by checking the rate of change in the logic values of (A', B').

One drawback to the use of the Schmitt circuit in the foregoing quadrature encoding device of FIG. 3 is that the Schmitt circuit can be drifted in the threshold voltage due to aging or errors in manufacture, which can then undesirably affect the output characteristic of the quadrature encoding device. This drawback is illustratively depicted in FIG. 6. Assume $V_i$ is the waveform of the output opto-electrical signal from a photo transistor according to the specification of the photo transistor, and $V_r$ is the threshold voltage set to the Schmitt circuit. Typically, the threshold voltage $V_r$ is set at the midpoint between the maximum and minimum amplitudes of $V_i$, which allows the duration of the high-voltage output in the square-wave signal from the Schmitt circuit to be substantially equal to the duration of the low-voltage output, as indicated by the waveform $V_o$ in FIG. 6. However, in practice, it is usually impossible to manufacture every photo transistor to possess the same output characteristic according to its specification. In the event that the output opto-electrical signal from a certain photo transistor has a maximum amplitude lower than the specification, as the waveform indicated by $V_i'$ in FIG. 6, the duration of the high-voltage output in the square-wave signal from the Schmitt circuit would be shorter than the duration of the low-voltage output, as indicated by the waveform $V_o'$ in FIG. 6. This deviation would result in errors in the logic values of the two square-wave signals from the quadrature encoding device, thus resulting in an erroneous control of the mouse cursor on the computer screen by the MCU. Moreover, the ambient light can affect the output characteristic of the photo transistors, which would also result in errors in the position control of the mouse cursor.

One conventional solution to the foregoing problem is to use analog-to-digital converting means or the equivalent that is capable of adaptively adjusting the threshold voltage based on the output characteristic of the photo transistor being used. This solution, however, requires a more complex hardware circuit to implement, thus considerably increasing the manufacturing cost.

In conclusion, the use of Schmitt circuit in the conventional quadrature encoding device for a mechanical mouse has the following disadvantages.

(1) First, the Schmitt circuit can be easily affected in its output characteristic by the ambient light, which would cause an erroneous control to the mouse cursor.

(2) Second, in the event that the photo transistor used in conjunction with the Schmitt circuit has a deviated output characteristic, the threshold voltage of the Schmitt circuit should be adaptively adjusted, which requires complex hardware circuit to implement, causing the manufacturing cost to be high.

SUMMARY OF THE INVENTION

It is therefore an objective of the present invention to provide a quadrature encoding device with slope-triggered digitizing circuit for converting opto-electrical signals into square-wave output signals, whose output characteristic would not be affected by any deviations in the output characteristics of the associated photo detectors that are used to generate the opto-electrical signals.

It is another objective of the present invention to provide a quadrature encoding device with slope-triggered digitizing circuit, whose output characteristic would not be affected by the ambient light.

It is still another objective of the present invention to provide a quadrature encoding device with slope-triggered digitizing circuit, which is simpler in structure that can help save manufacturing cost.

In accordance with the foregoing and other objectives of the present invention, a quadrature encoding device with slope-triggered digitizing circuit is provided. The quadrature encoding device of the invention includes a light source for generating a light beam; a double-detector photo detection module including a pair of photo detectors separated in position by a predetermined distance, each of the photo detectors being capable of generating an opto-electrical signal in response to the light beam from the light source; a turning disk with a plurality of slots formed on the rim thereof, which allows the light beam from the light source to pass therethrough in an intermittent manner onto the double-detector photo detection module when the turning disk is being turned to rotate, allowing the double-detector photo detection module to produce two opto-electrical signals that are 90° out of phase with each other; a first slope-triggered digitizing circuit capable of generating a first square-wave signal in response to the first opto-electrical signal generated by the first photo detector of the double-detector photo detection module, in such a manner that when the current slope of the waveform of the first opto-electrical signal is positive, the first slope-triggered digitizing circuit produces a first voltage output; and when negative, the first slope-triggered digitizing circuit produces a second voltage output; and a second slope-triggered digitizing circuit capable of generating a second square-wave signal in response to the second opto-electrical signal generated by the second photo detector of the double-detector photo detection module, in such a manner that when the current slope of the waveform of the second opto-electrical signal is positive, the second slope-triggered digitizing circuit produces a first voltage output; and when negative, the second slope-triggered digitizing circuit produces a second voltage output.

In the foregoing quadrature encoding device, the first and second slope-triggered digitizing circuits each include: a delay circuit having an input end connected to the input end of the slope-triggered digitizing circuit and whose output is a delayed version of the received signal; and an analog comparator having a first input end connected to the input end of the slope-triggered digitizing circuit and a second input end connected to the output end of the delay circuit, which is capable of generating a first voltage output when the voltage at the first input end is greater than the voltage at the second input end and a second voltage output when the voltage at the first input end is smaller than the voltage at the second input end.

The delay circuit further includes a resistor having one end connected to tile input end of the delay circuit and the other end connected to the output end of the delay circuit; and a capacitor having one end connected to the output end of the delay circuit and the other end connected to the ground.

The light source can be a light-emitting diode (LED), and the first and second photo detectors can be each a photo transistor.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
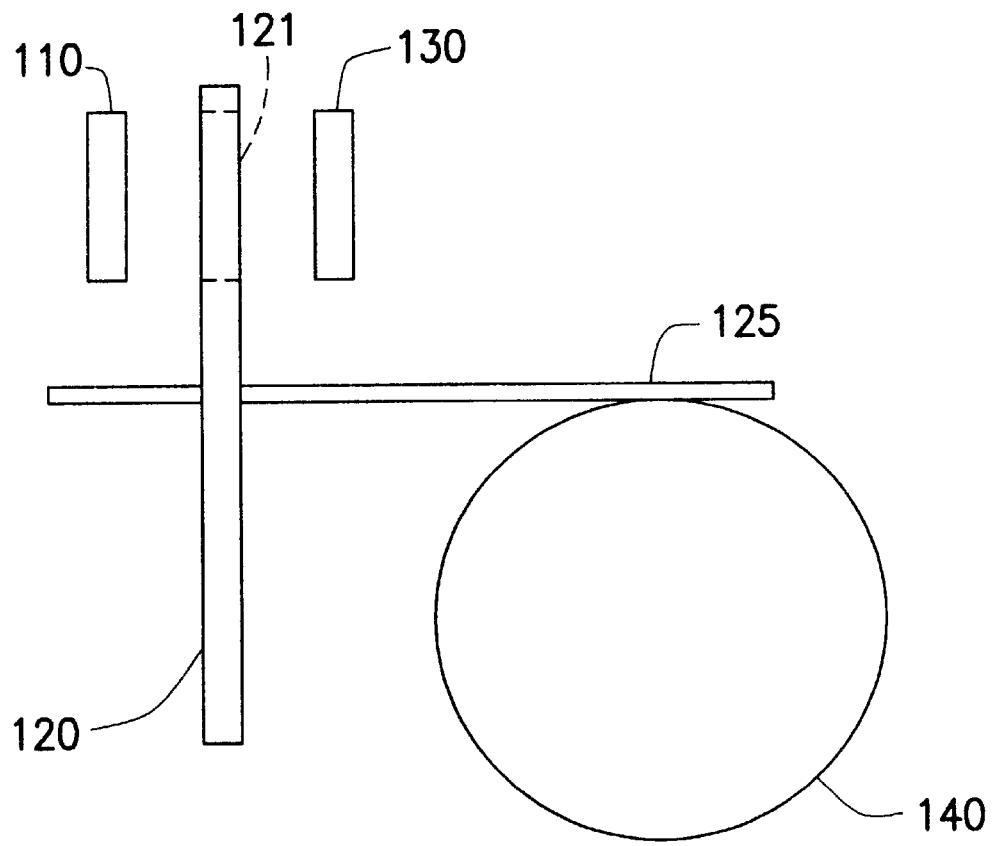
FIG. 1 is a schematic diagram used to depict the operation of a typical mechanical mouse.
Figure 2A:
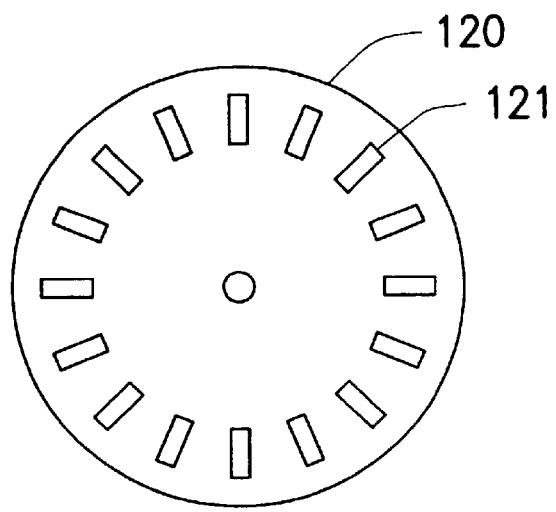
FIG. 2A is a schematic diagram showing a front view of the turning disk utilized in the mouse of FIG. 1.
Figure 2B:
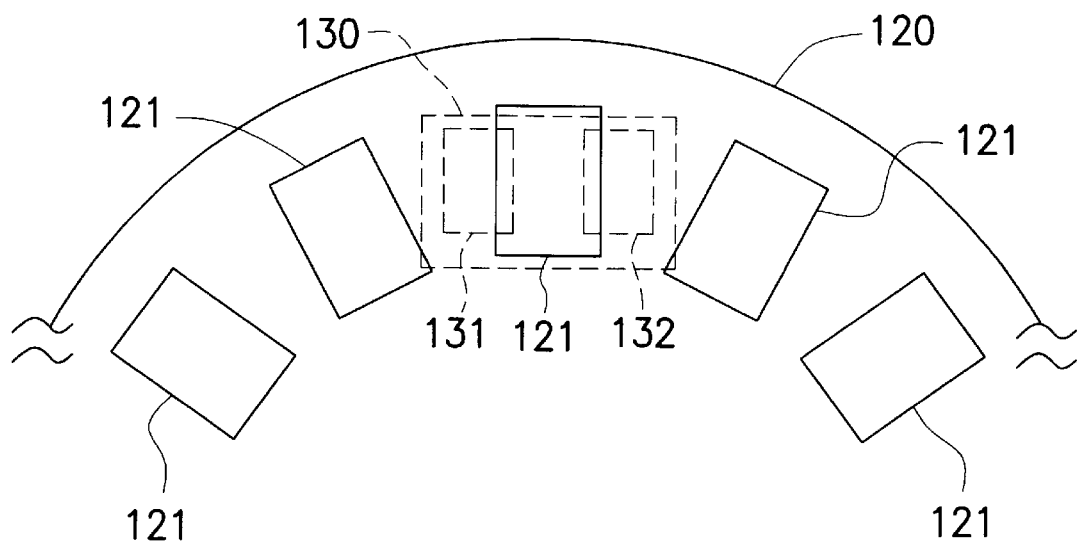
FIG. 2B is a schematic diagram used to depict the operation of the turning disk and the double-detector photo detection module utilized in the mouse of FIG. 1.
Figure 2C:
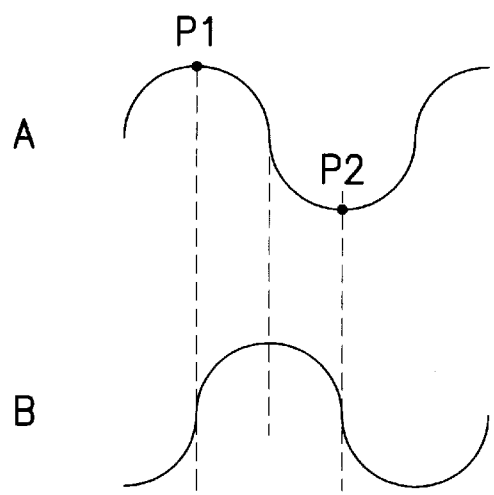
FIG. 2C is a waveform diagram showing the waveforms of two opto-electrical signals that are generated by two photo transistors in the double-detector photo detection module utilized in the mouse of FIG. 1.
Figure 3:
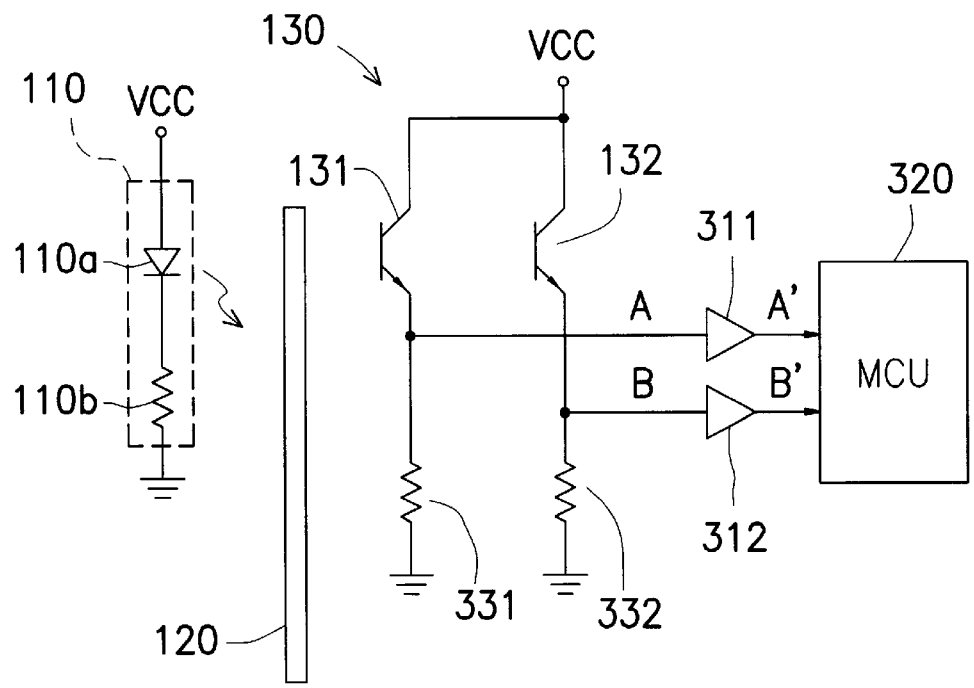
FIG. 3 is a schematic diagram showing the detailed circuit structure of a conventional quadrature encoding device with a pair of Schmitt circuits.
Figure 4:
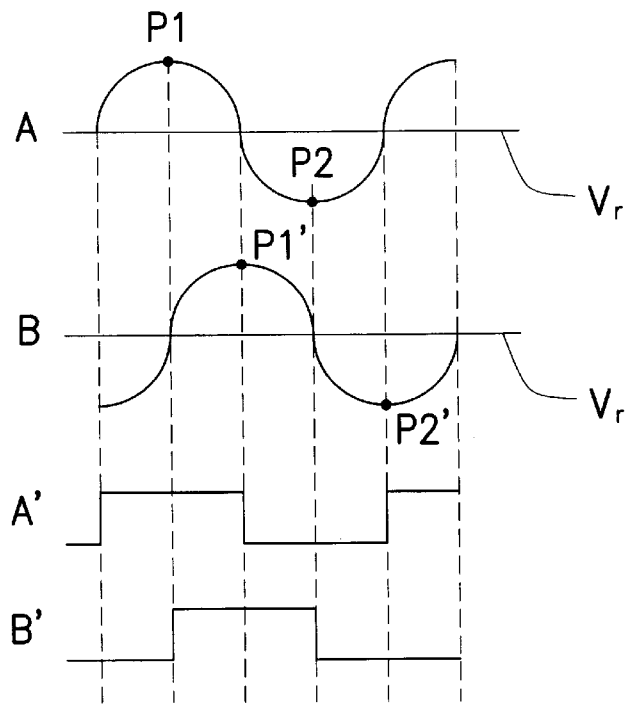
FIG. 4 is a waveform diagram used to depict the waveforms and timings of the output opto-electrical signals from the double-detector photo detection module and the output square-wave signals from the two Schmitt circuit in the conventional quadrature encoding device of FIG. 3.
Figure 5A:
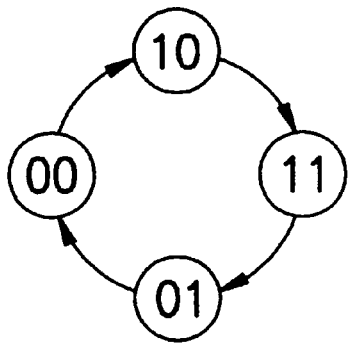
FIGS. 5A–5B are schematic diagrams used to depict the significance of the logic values of the two square-wave signals generated by the Schmitt circuits in the conventional quadrature encoding device of FIG. 3.
Figure 5B:
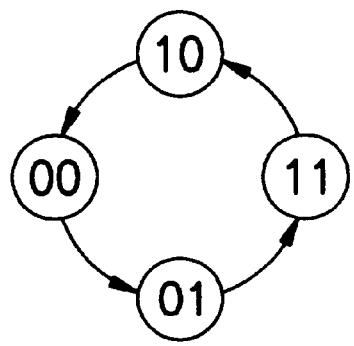
Figure 6:
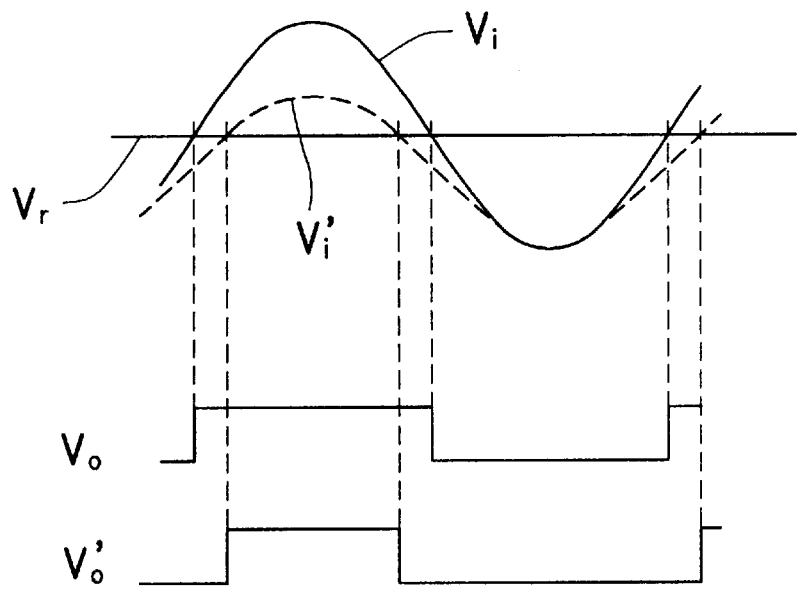
FIG. 6 is a waveform diagram used to explain the drawback of the use of the Schmitt circuits in the conventional quadrature encoding device of FIG. 3.
Figure 7:
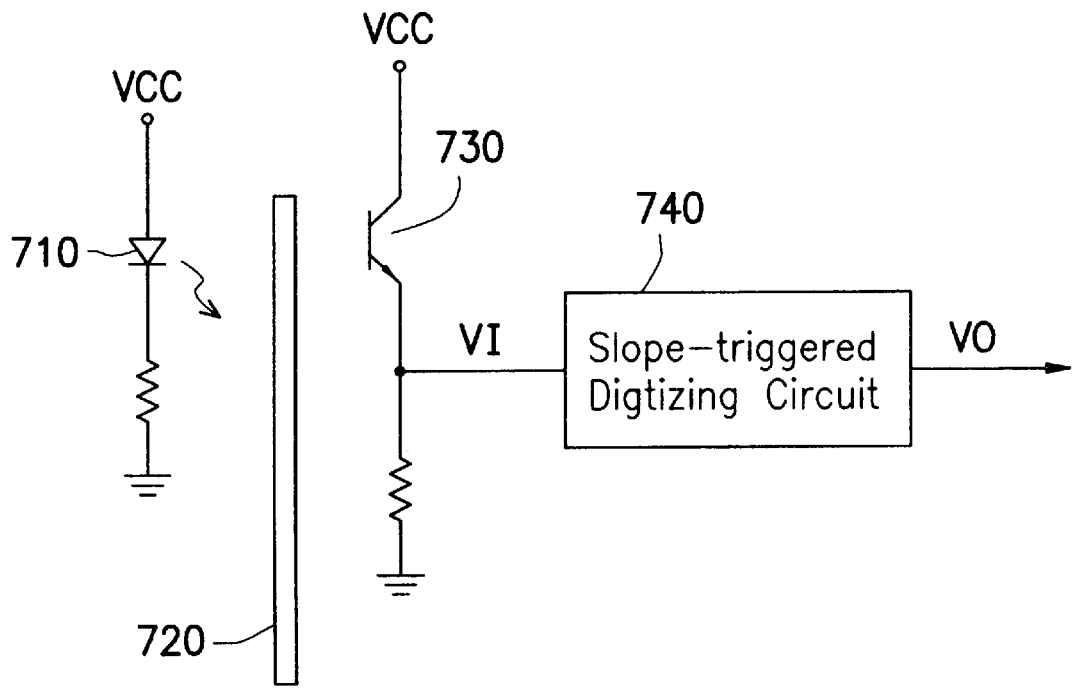
FIG. 7 is a schematic diagram showing the quadrature encoding device according to the invention with a slope-triggered digitizing circuit.

FIG. 7 is a schematic diagram showing the quadrature encoding device according to the invention. As shown, the quadrature encoding device of the invention includes a light source 710 such as a light-emitting diode (LED), a turning disk 720, a photo detector 730 such as a photo transistor, and a slope-triggered digitizing circuit 740. The structure and function of the light source 710, the turning disk 720, and the photo detector 730 can be identical with the prior art, so detailed description thereof will not be repeated.

Figure 8:
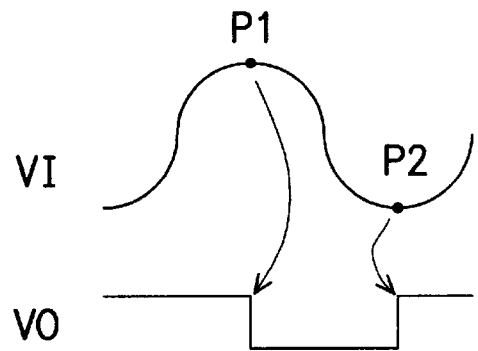
FIG. 8 is a waveform diagram showing the output-to-input characteristic of the slope-triggered digitizing circuit utilized in the quadrature encoding device of the invention.

The output opto-electrical signal VI from the photo detector 730 is generated in response to the light that is intermittently received through the slots in the turning disk 720 from the light source 710 when the turning disk 720 is being turned to rotate. In accordance with the invention, the output opto-electrical signal VI is subsequently converted by the slope-triggered digitizing circuit 740 into a square-wave signal. The waveform of the output opto-electrical signal VI from the photo detector 730 is illustrated in FIG. 8. As shown, the opto-electrical signal VI has a maximum amplitude at the point P1 and a minimum amplitude at the point P2. The output opto-electrical signal VI from the photo detector 730 is generated in the same manner as the prior art, so detailed description thereof will not be repeated.

It can be seen from FIG. 8 that when the output voltage VI is rising toward the maximum amplitude point P1, the rate of change of the amplitude against time (i.e., the slope) is positive; and when falling toward the minimum amplitude point P2, the slope is negative. At the maximum amplitude point P1, the instant slope is changing from positive to negative; and whereas, at the minimum amplitude point P2, the instant slope is changing from negative to positive. The slope-triggered digitizing circuit 740 is designed to generate a square-wave signal in response to the output opto-electrical signal VI from the photo detector 730. More specifically, the slope-triggered digitizing circuit 740 is designed in such a manner that whenever the current slope of the output opto-electrical signal VI from the photo detector 730 is positive, the output square-wave signal VO from the slope-triggered digitizing circuit 740 is switched to a first logic state, for example a high-voltage logic state representing a logic value of 1; and when negative, the output square-wave signal VO is switched to a second logic state, for example a low-voltage logic state representing a logic value of 0, as illustrated in FIG. 8. Therefore, when the opto-electrical signal VI is rising toward the maximum amplitude point P1, the output square-wave signal VO from the slope-triggered digitizing circuit 740 is switched to the high-voltage logic state; and when the opto-electrical signal VI is falling toward the minimum amplitude point P2, the square-wave signal VO is switched to the low-voltage logic state.

Figure 9:
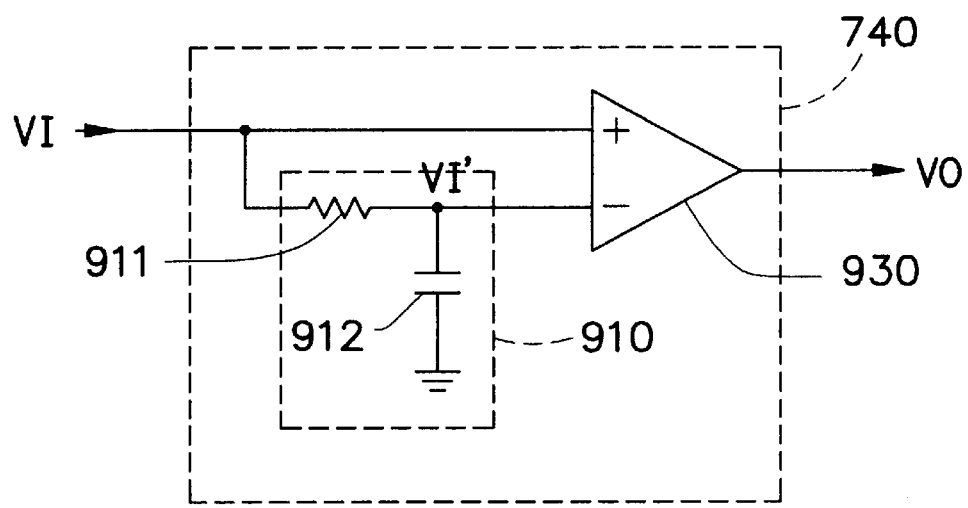
FIG. 9 is a schematic diagram showing detailed inside circuit structure of the slope-triggered digitizing circuit utilized in the quadrature encoding device of the invention.
Figure 10:
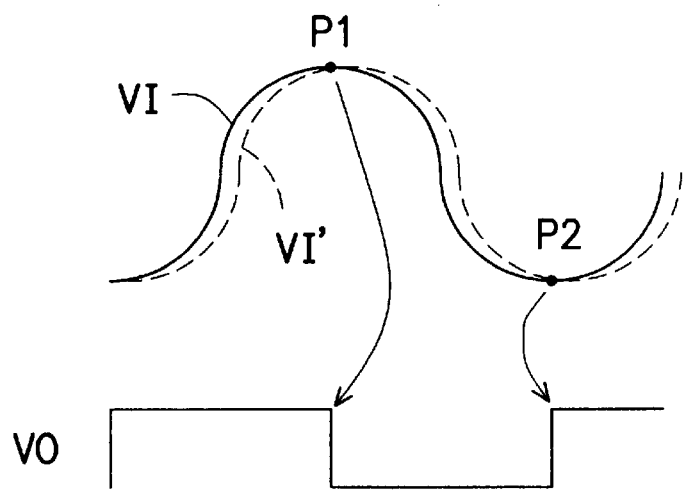
FIG. 10 is a waveform diagram showing the output-to-input characteristic of the slope-triggered digitizing circuit of FIG. 9.

FIG. 9 is a schematic diagram showing the detailed inside circuit structure of the slope-triggered digitizing circuit 740. As shown, the slope-triggered digitizing circuit 740 includes a delay circuit 910 (which is an RC circuit composed of a resistor 911 and a capacitor 912) and an analog comparator 930. The delay circuit 910 takes the output opto-electrical signal VI from the photo detector 730 as input. The output of the delay circuit 910 is designated by VI', which is a delayed version of VI by a predetermined duration dependent on the RC value. The analog comparator 930 has a positive input end (+) connected directly to receive VI and a negative input end (−) connected to the output of the delay circuit 910. The output of the analog comparator 930 serves as the output VO of the slope-triggered digitizing circuit 740. In FIG. 10, the opto-electrical signal VI is plotted as a solid curve, while its delayed version VI' is plotted as a dashed curve. The analog comparator 930 is a bistable circuit that operates in such a manner that when the voltage at the positive input end (+) is higher than the voltage at the negative input end (−), it produces a high-voltage output; and when the voltage at the positive input end (+) is lower than the voltage at the negative input end (−), it produces a low-voltage output. Therefore, as illustrated in FIG. 10, when VI is rising toward the maximum amplitude point P1, it will be always greater in amplitude than its delayed version VI', thus causing the analog comparator 930 to produce a high-voltage output, representing a first logic value, for example 1; and when VI is falling toward the minimum amplitude point P2, it will be always smaller in amplitude than its delayed version VI', thus causing the analog comparator 930 to produce a low-voltage output, representing a second logic value, for example 0. After passing the minimum amplitude point P2, the slope of the waveform of VI is changed to positive, thus switching the output VO again to the high-voltage state. This process is repeatedly performed as long as the mouse is being moved by the user.

The foregoing description depicts the structure and operation of one single slope-triggered digitizing circuit 740. In a mechanical mouse, it requires the use of two such slope-triggered digitizing circuits to implement the quadrature encoding of the mouse movement.

Figure 11:
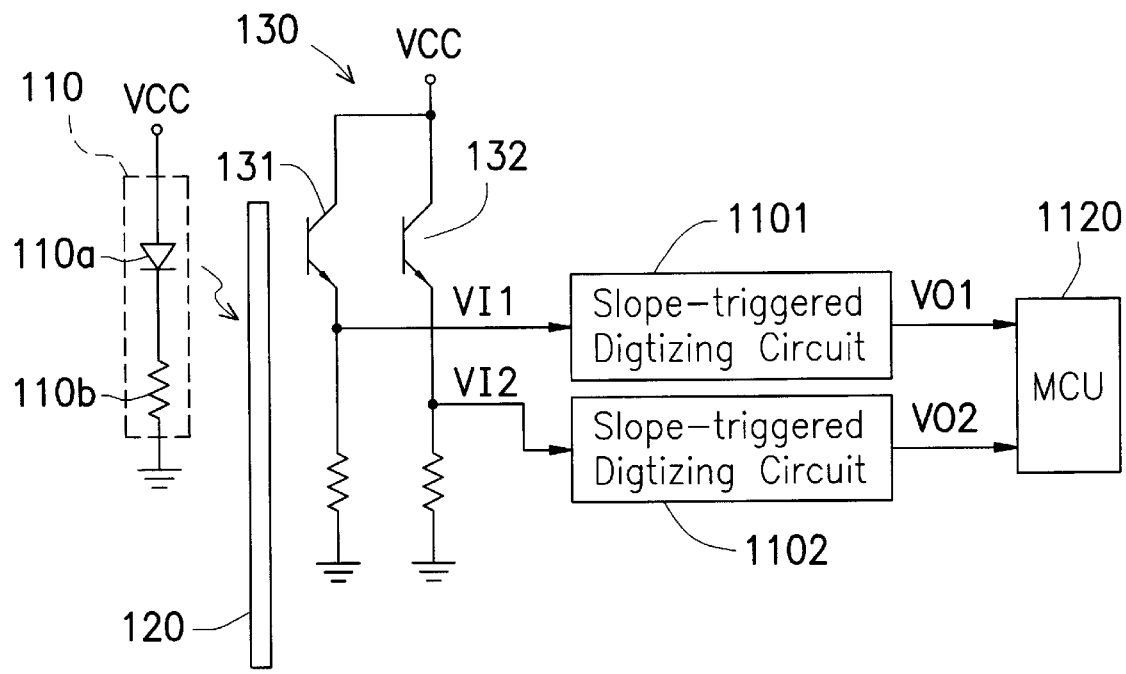
FIG. 11 is a schematic diagram showing a complete quadrature encoding device with a pair of slope-triggered digitizing circuits.

FIG. 11 is a schematic diagram showing a complete quadrature encoding device for a mechanical mouse, which is incorporated with a pair of slope-triggered digitizing circuits, as here respectively designated by the reference numerals 1101, 1102. Each of the first and second slope-triggered digitizing circuits 1101, 1102 is structured identically as the circuit shown in FIG. 9. In addition, the quadrature encoding device includes a light source 110 such as an LED, a turning disk 120, and a double-detector photo detection module 130 (which includes a first photo transistor 131 and a second photo transistor 132), and a microcontroller unit (MCU) 1120. These constituent elements can be identical in structure and function as those utilized in the prior art, so description thereof will not be further detailed. The quadrature encoding device of the invention is particularly characterized in the provision of the two slope-triggered digitizing circuits 1101, 1102 as compared to the prior art.

Figure 12:
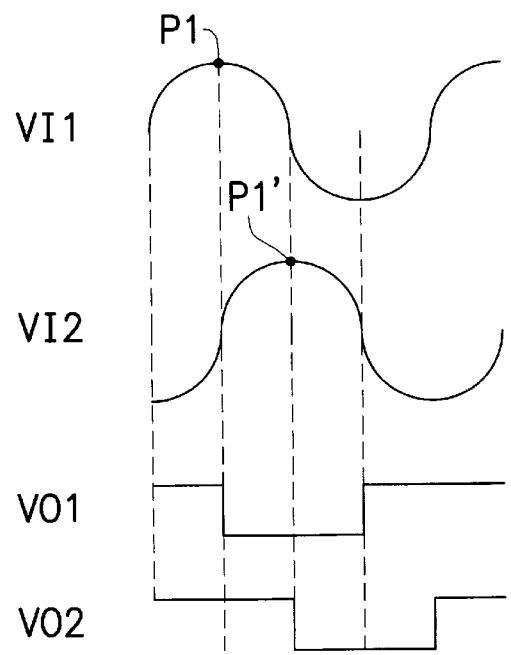
FIG. 12 is a waveform diagram showing the output-to-input characteristics of the two slope-triggered digitizing circuits utilized in the quadrature encoding device of FIG. 11.

In operation, the first photo transistor 131 produces a first opto-electrical signal VI1 while the second photo transistor 132 generates a second opto-electrical signal VI2 in response to the light that is intermittently received through the slots in the turning disk 120 when the turning disk 120 is being turned to rotate. The phase relationship between VI1 and VI2 is shown in FIG. 12. As shown, the two opto-electrical signals VI1, VI2 have the same period, but VI2 is 90° out of phase with VI1. When the first opto-electrical signal VI1 reaches its maximum amplitude point P1, the second opto-electrical signal VI2 will reach its maximum amplitude point P1' after a duration of ¼ of the period thereof. The output VO1 from the first slope-triggered digitizing circuit 1101 and the output VO2 from the second slope-triggered digitizing circuit 1102 in response to VI1 and VI2 are shown in FIG. 12, which are each a square-wave signal. The two square-wave signals VO1 and VO2 are then transferred to the MCU 1120 for the MCU 1120 to determine the direction and displacement of the current mouse movement to thereby control the position of the mouse cursor on the computer screen. Assume the high-voltage logic state in the square-wave signal represents a logic value of 1, and the low-voltage logic state represents a logic value of 0. Then, when (VO1, VO2) varies in the sequence (00)→(10)→(11)→(01)→(00), it indicates that the turning disk 120 is currently being rotated in the clockwise direction. Whereas, when (VO1, VO2) varies in the sequence (00)→(01)→(11)→(10)→(00), it indicates that the turning disk 120 is currently being rotated in the counterclockwise direction. Moreover, the speed of the mouse movement can be determined by checking the rate of change in the logic values of (VO1, VO2). The MCU 1120 used here can be identical in function as the prior art, so description thereof will not be further detailed.

It can be learned from the foregoing description that the invention provides a quadrature encoding device with a pair of slope-triggered digitizing circuits, each of which can produce a square-wave signal with the high and low voltage states thereof being activated by the current slope of the waveform of the opto-electrical signal.

In conclusion, the invention has the following advantages over the prior art.

(1) First, the invention utilizes a pair of slope-triggered digitizing circuits that can produce the square-wave signals by detecting the current slope of the waveform of the opto-electrical signal instead of comparing the signal waveform against a preset threshold voltage. This feature allows the output characteristic of the slope-triggered digitizing circuits not to be affect by any deviations in the output characteristics of the photo transistors being used and also not to be affected by the ambient light.

(2) Second, the invention utilizes a pair of slope-triggered digitizing circuits that can operate without having to make adjustments on threshold voltage as in the prior art. This feature allows the invention to be more convenient to use, simpler in circuit complexity, and lower in manufacturing cost as compared to the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A quadrature encoding device, which comprises:
   a light source for generating a light beam;
   a photo detector which generates an opto-electrical signal in response to the light beam from the light source;
   a turning disk with a plurality of slots formed substantially at equal intervals on the rim thereof, which allows the light beam from the light source to pass therethrough in an intermittent manner when the turning disk is being turned to rotate; and
   a slope-triggered digitizing circuit which generates a square-wave signal in response to the opto-electrical signal generated by the photo detector, in such a manner that when the current slope of the waveform of the opto-electrical signal is positive, the slope-triggered digitizing circuit producing a first voltage output; and when negative, the slope-triggered digitizing circuit producing a second voltage output.

2. The quadrature encoding device of claim 1, wherein the slope-triggered digitizing circuit includes:

a delay circuit having an input end connected to the input end of the slope-triggered digitizing circuit and whose output is a delayed version of the received signal; and an analog compactor having a first input end connected to the input end of the slope-triggered digitizing circuit and a second input end connected to the output end of the delay circuit, which generates a first voltage output when the voltage at the first input end is greater than the voltage at the second input end and a second voltage output when the voltage at the first input end is smaller than the voltage at the second input end.

3. The quadrature encoding device of claim 2, wherein the delay circuit includes:

a resistor having one end connected to the input end of the delay circuit and the other end connected to the output end of the delay circuit; and a capacitor having one end connected to the output end of the delay circuit and the other end connected to the ground.

4. The quadrature encoding device of claim 1, wherein the light source is a light-emitting diode.

5. The quadrature encoding device of claim 1, wherein the photo detector is a photo transistor.

6. A quadrature encoding device, which comprises:

a light source for generating a light beam;

a double-detector photo detection module including a pair of photo detectors separated in position by a predetermined distance, each of the photo detectors which generates an opto-electrical signal in response to the light beam from the light source;

a turning disk with a plurality of slots formed substantially at equal intervals on the thereof, which allows the light beam from the light source to pass therethrough in an intermittent manner onto the double-detector photo detection module when the turning disk is being turned to rotate, allowing the double-detector photo detection module to produce two opto-electrical signals;

a first slope-triggered digitizing circuit which generates a first square-wave signal in response to the first opto-electrical signal generated by the first photo detector of the double-detector photo detection module, in such a manner that when the current slope of the waveform of the first opto-electrical signal is positive, the first slope-triggered digitizing circuit produces a first voltage output; and when negative, the first slope-triggered digitizing circuit produces a second voltage output; and a second slope-triggered digitizing circuit which generates a second square-wave signal in response to the second opto-electrical signal generated by the second photo detector of the double-detector photo detection module, in such a manner that when the current slope of the waveform of the second opto-electrical signal is positive, the second slope-triggered digitizing circuit produces a first voltage output; and when negative, the second slope-triggered digitizing circuit produces a second voltage output.

7. The quadrature encoding device of claim 6, wherein the first and second slope-triggered digitizing circuits each include:

a delay circuit having an input end connected to the input end of the slope-triggered digitizing circuit and whose output is a delayed version of the received signal; and an analog compactor having a first input end connected to the input end of the slope-triggered digitizing circuit and a second input end connected to the output end of the delay circuit, which generates a first voltage output when the voltage at the first input end is greater than the voltage at the second input end and a second voltage output when the voltage at the first input end is smaller than the voltage at the second input end.

8. The quadrature encoding device of claim 7, wherein the delay circuit includes:

a resistor having one end connected to the input end of the delay circuit and the other end connected to the output end of the delay circuit; and a capacitor having one end connected to the output end of the delay circuit and the other end connected to the ground.

9. The quadrature encoding device of claim 6, wherein the turning disk is formed in such a manner that the slots therein are formed with a predetermined fixed width and arranged at a predetermined fixed interval equal to the width of the slots and also equal to ¾ of the separating distance between the two photo detectors on the double-detector photo detection module, allowing the two opto-electrical signals from the double-detector photo detection module to be 90° output of phase with each other.

10. The quadrature encoding device of claim 9, wherein when the turning disk is currently being rotated in a first direction, the combination of the logic values of the first and second square-wave signals varies cyclically in the sequence (00)→(10)→(11) →(01)→(00); and whereas, when the turning disk is currently being rotated in a second direction, the same varies cyclically in the sequence (00)→(01)→(11) →(10)→(00).

11. The quadrature encoding device of claim 6, wherein the light source is a light-emitting diode.

12. The quadrature encoding device of claim 6, wherein the first and second photo detectors are each a photo transistor.

* * * * *